United States Patent [19]

Neefe

[11] 4,406,189

[45] Sep. 27, 1983

[54] METHOD OF MAKING LENSES WITH A LENTICULAR CUT

[76] Inventor: Charles W. Neefe, 2701 Rebecca St., Big Spring, Tex. 79720

[21] Appl. No.: 262,034

[22] Filed: May 11, 1981

Related U.S. Application Data

[63] Continuation-in-part of Ser. No. 162,517, Jun. 24, 1980, abandoned, which is a continuation-in-part of Ser. No. 91,733, Nov. 6, 1979, abandoned, which is a continuation-in-part of Ser. No. 972,526, Dec. 22, 1978, Pat. No. 4,202,848, which is a continuation-in-part of Ser. No. 874,934, Feb. 3, 1978, Pat. No. 4,150,073, which is a continuation-in-part of Ser. No. 793,388, May 25, 1977, abandoned.

[51] Int. Cl.³ .............................................. B23B 1/00
[52] U.S. Cl. .......................................... 82/1 C; 82/11; 82/18; 51/284 R
[58] Field of Search ....................... 82/1 C, 11, 12, 18; 51/284

[56] References Cited

U.S. PATENT DOCUMENTS

| 3,624,719 | 11/1971 | Romi | 82/1 C |
| 4,084,458 | 4/1978 | Galley | 82/12 X |
| 4,134,315 | 1/1979 | Bendini | 82/12 X |
| 4,239,712 | 12/1980 | Neefe | 82/11 X |

Primary Examiner—Donald R. Schran

[57] ABSTRACT

A method of rapidly making lenticular contact lenses having a flange thinner than the optical section of the lens and of uniform thickness regardless of refractive power.

1 Claim, 2 Drawing Figures

METHOD OF MAKING LENSES WITH A LENTICULAR CUT

This is a continuation-in-part of application Ser. No. 162,517 filed June 24, 1980 entitled: A METHOD OF MAKING A LENTICULAR CUT CONTACT LENS, now abandoned; which is a continuation-in-part of application Ser. No. 91,733 filed Nov. 6, 1979 entitled: A METHOD OF MAKING LENSES WITH ONE CAST OPTICAL SURFACE, now abandoned; which is a continuation-in-part of application Ser. No. 972,526, filed Dec. 22, 1978 entitled: A METHOD OF MAKING BIFOCAL CONTACT LENSES now U.S. Pat. No. 4,202,848; which is a continuation-in-part of application Ser. No. 874,934, filed Feb. 3, 1978 entitled: A METHOD OF CONTROLLING THE ADHESION OF A MOLDED PLASTIC LENS, now U.S. Pat. No. 4,150,073; which is a continuation-in-part of application Ser. No. 793,388 filed May 25, 1977 entitled: A METHOD OF MAKING HIGH QUALITY PLASTIC LENSES, now abandoned.

Figure 1:
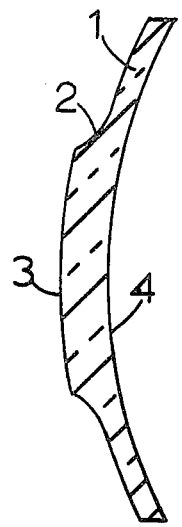
FIG. 1 shows the lenticular lens in section.

THE METHOD OF MAKING THE LENSES IS AS FOLLOWS:

A master positive mold having the curvature required on the concave surface of the finished lens is made from glass, stainless steel or other materials which withstand the molding pressures and temperatures.

The master positive mold is placed in a sleeve, a molding grade of a resinous material such as polyimide, polycarbonate, Polymethylpentene, polyethylene, polypropylene, or other molding material is also placed in the sleeve. The sleeve and it's contents are heated to the softening point of the molding material, pressure is applied to form the negative lens molds. When sufficient heat and pressure have been applied, the molding compound will fill the area around the positive mold forming a curved optical surface at the bottom of a cup like mold. Either injection or compression molding may be used to produce the negative resinous mold. A liquid or syrup monomer material containing a suitable catalyst is placed in the cup over the optical surface at the bottom of the cup and covered to prevent evaporation of the monomer. The liquid monomer is polymerized to form a solid monolithic mass.

It is not necessary to remove the hardened plastic lens material from the mold before cutting the convex curve. The mold may be placed in a suitable lathe or grinding machine and the convex curvature cut and polished without being removed from the disposable mold. The mold has served as a support for the monomer and provided the molded optical surface which may be aspheric or may be composed of two or more spherical segments. The mold also serves as the holding block to facilitate cutting to the required thickness. The thickness of the mold may be measured before adding the monomer and measurements may be taken during the cutting operation and the lens thickness determined by subtracting the thickness of the mold. The mold also serves as a holding fixture during the polishing operation. The lens is supported by the optical surface present on the mold; therefore, the lens material must adhere strongly to the supporting mold in order to withstand the forces of cutting and polishing. It is understood the conventional methods of cutting and polishing both convex and concave surface may be used to practice the invention.

PREFERRED EMBODIMENT

The following technique of cutting minus or negative refractive power lenticular lenses both hard and soft, provides an edge flange having a consistent thickness and width. The thin flexible peripheral flange when used on soft lenses conforms to the shape of the eye and gives distinct advantages. Minus refraction power lenses must have an optical zone edge thicker than the center in order to provide the negative refractive power. The present method provides minus lenses having consistant edge thickness outside the optical zone regardless of refractive power. Among the advantages are:

(1) Very comfortable lenses with excellent reproducibility.

(2) Improved centering and stability on the eye.

(3) The ability to mask a higher degree of corneal astigmatism as the thin edge conforms to the shape of the eye more rapidly than the thicker center.

(4) Fitting characteristics are similar for all powers.

Figure 2:
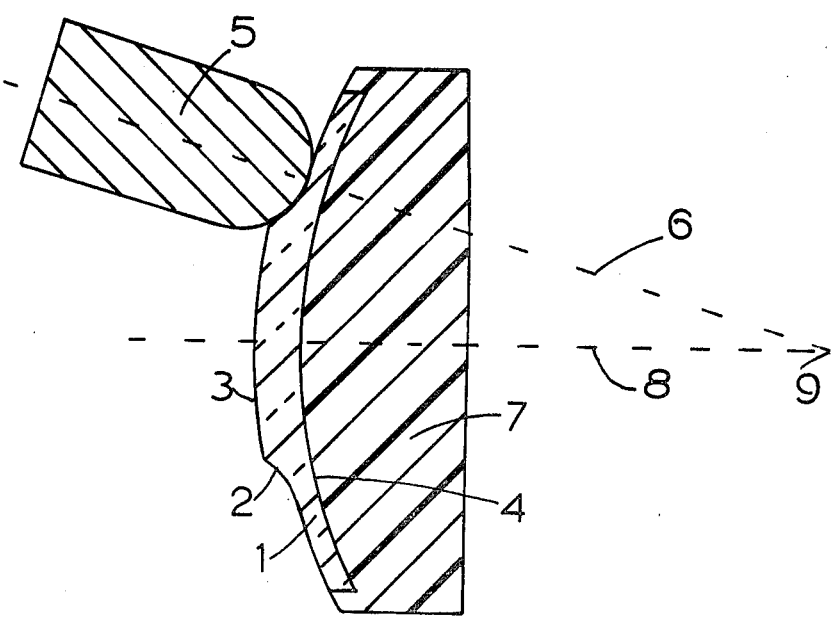
FIG. 2 shows the lenticular lens in the mold in section.

The lens power is cut and polished in the usual manner. The lathe quadrant slide is set to a radius of from 0.01 m/m to 0.30 m/m longer than the central concave curve, 4 FIGS. 1 and 2, the lens 1 and the mold 7 FIG. 2, is placed on the lathe, the diamond cutter is moved to the center stop and the thickness slide is advanced until a touch between the polished lens surface and the diamond is almost achieved. A clearance of less than 0.05 m/m is left between the diamond cutter and the polished lens surface, a 7× to 10× hand magnifier is used to arrive at this position. The lathe thickness indicator is set to 0.00 and the diamond cutter is moved away from the optical surface using the thickness slide. The lathe quadrant is rotated away from the center stop to a point where the diamond cutter is off the lens surface. The lathe thickness indicator is returned to the 0.00 setting by advancing the thickness slide and the lathe motor is started. A cut is made from the lens edge toward the center leaving a 7.0 m/m polished optical zone, 3 FIGS. 1 and 2. A position of approximately 35°, the angle between 8 and 6 FIG. 2, from center will yield the desired 7.0 m/m zone. The degrees required will vary with the shape of the diamond point, 5 FIG. 2. Once the correct degrees are known, a removable stop should be installed for future use. The optical zone size is a matter of preference, we have found 7 m/m to be acceptable. The flange, 1 FIGS. 1 and 2, is cut with a very slow even movement in and out to facilitate a faster polish. The flange, 1 FIGS. 1 and 2, does not require an optical surface only a good polish; therefore the flange may be hand polished using a Q-tip and tin oxide polishing agent. The Q-tip is held against the rotating surface and slowly rolled between the fingers. A good polish can be achieved in one minute. A flange polishing machine which is commonly available may also be used. The lens is removed from the mold and the edge polished in the usual manner.

After the lens is processed to the required specifications, the lens is removed by softening the mold by heating and sharply flexing the mold, 7 FIG. 2, separating the finished optical lens from its support.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the inventions. It is intended that all matter contained in the above description shall be interpreted as illustrative and not in a limiting sense.

I claim:

1. A method of making lenticular negative refractive power contact lenses having identical edge thickness and contours regardless of the central lens refractive power by the steps of providing a negative power lens having polished optical surfaces present on the concave and convex surface, cutting a second non-optical convex curve on the periphery of the convex optical surface, by rotating the minus refractive power lens around its optical axis on a contact lens turning lathe, moving the cutting tool toward the optical axis to a preselected distance from the optical axis, thereby cutting a second convex curve on the peripheral edge of the lens, the second convex curve having a radius of from 0.01 millimeter to 0.30 millimeter longer than the concave curve present on the lens.

* * * * *